US011696207B2

United States Patent
Lin (10) Patent No.: US 11,696,207 B2
(45) Date of Patent: *Jul. 4, 2023

(54) DATA TRANSMISSION METHOD, ELECTRONIC DEVICE, AND COMPUTER READABLE STORAGE MEDIUM

(71) Applicant: GUANGDONG OPPO MOBILE TELECOMMUNICATIONS CORP., LTD., Guangdong (CN)

(72) Inventor: Jinquan Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 140 days.

This patent is subject to a terminal disclaimer.

(21) Appl. No.: 17/212,753

(22) Filed: Mar. 25, 2021

(65) Prior Publication Data

US 2021/0211965 A1 Jul. 8, 2021

Related U.S. Application Data

(63) Continuation of application No. 16/522,290, filed on Jul. 25, 2019, now Pat. No. 10,993,166.

(30) Foreign Application Priority Data

Aug. 23, 2018 (CN) .......................... 201810968293.0

(51) Int. Cl.
*H04W 40/12* (2009.01)
*H04L 45/00* (2022.01)
(Continued)

(52) U.S. Cl.
CPC .......... *H04W 40/12* (2013.01); *H04B 17/336* (2015.01); *H04L 45/22* (2013.01); *H04L 45/28* (2013.01); *H04W 36/0007* (2018.08)

(58) Field of Classification Search
None
See application file for complete search history.

(56) References Cited

U.S. PATENT DOCUMENTS 9,825,846 B1 * 11/2017 Burns ................. H04L 43/0829
2003/0002494 A1 * 1/2003 Kuukankorpi ...... H04L 63/0254
370/386
(Continued)

FOREIGN PATENT DOCUMENTS

| CN | 101211327 A | 7/2008 |
| CN | 102075566 A | 5/2011 |

(Continued)

OTHER PUBLICATIONS

International Search Report for PCT/CN2019/100390 dated Oct. 30, 2019.

(Continued)

*Primary Examiner* — Jamaal Henson
(74) *Attorney, Agent, or Firm* — Young Basile Hanlon & MacFarlane, P.C.

(57) ABSTRACT

A data transmission method, electronic device and computer readable storage medium are provided. The method includes: acquiring a first data packet to be sent; determining a first data stream to which the first data packet belongs; detecting a link state of the first data stream; when the link state of the first data stream is an establishing state, and the first data packet is sent for the first time, selecting a first wireless communication link from the plurality of wireless communication links for the first data packet, and marking the first data packet according to a first link identifier of the first wireless communication link; and sending the first data packet through a network interface of the first wireless communication link according to the first link identifier.

14 Claims, 4 Drawing Sheets

(51) Int. Cl.
  *H04W 36/00* (2009.01)
  *H04B 17/336* (2015.01)
  *H04L 45/28* (2022.01)

(56) References Cited

U.S. PATENT DOCUMENTS

| | | | | |
|---|---|---|---|---|
| 2005/0053007 | A1* | 3/2005 | Bernhardt | H04L 45/122 |
| | | | | 370/252 |
| 2006/0209891 | A1* | 9/2006 | Yamada | H04L 47/70 |
| | | | | 455/452.2 |
| 2006/0221998 | A1* | 10/2006 | Livet | H04L 12/5692 |
| | | | | 370/464 |
| 2007/0097945 | A1* | 5/2007 | Wang | H04W 40/246 |
| | | | | 370/349 |
| 2007/0147320 | A1* | 6/2007 | Sattari | H04L 47/824 |
| | | | | 370/338 |
| 2008/0114892 | A1* | 5/2008 | Bruno | H04L 47/10 |
| | | | | 709/234 |
| 2009/0147320 | A1* | 6/2009 | Lee | H04N 1/00018 |
| | | | | 358/475 |
| 2009/0175172 | A1* | 7/2009 | Prytz | H04L 45/1283 |
| | | | | 370/238 |
| 2012/0066305 | A1 | 3/2012 | Cheng et al. | |
| 2014/0012981 | A1 | 1/2014 | Samuell et al. | |
| 2014/0185519 | A1* | 7/2014 | Zhang | H04L 45/308 |
| | | | | 370/328 |
| 2017/0155580 | A1* | 6/2017 | Ramanujan | H04L 45/125 |
| 2018/0041305 | A1 | 2/2018 | Valliappan et al. | |
| 2018/0145919 | A1 | 5/2018 | Kalikot Veetil et al. | |
| 2019/0190835 | A1* | 6/2019 | Sung | H04L 47/2416 |
| 2019/0319873 | A1* | 10/2019 | Shelar | H04L 69/14 |

FOREIGN PATENT DOCUMENTS

| | | |
|---|---|---|
| CN | 102843265 A | 12/2012 |
| CN | 103067199 A | 4/2013 |
| CN | 104580158 A | 4/2015 |
| CN | 105228210 A | 1/2016 |
| CN | 105245317 A | 1/2016 |
| CN | 105308920 A | 2/2016 |
| CN | 105681326 A | 6/2016 |
| CN | 105704759 A | 6/2016 |
| CN | 105992272 A | 10/2016 |
| CN | 106559806 A | 4/2017 |
| CN | 105228210 B | 5/2017 |
| CN | 107197470 A | 9/2017 |
| CN | 107294859 A | 10/2017 |
| CN | 107566215 A | 1/2018 |
| CN | 107995036 A | 5/2018 |
| CN | 108337300 A | 7/2018 |
| CN | 109041262 A | 12/2018 |
| EP | 2036283 A1 | 3/2009 |
| EP | 3008868 A1 | 4/2016 |
| KR | 101278297 B1 | 7/2013 |

OTHER PUBLICATIONS

Extended EP Search Report for EP19189953.3 dated Dec. 12, 2019.
English Translation of First Chinese Office Action dated Mar. 23, 2020 from Application No. 201810968293.0.
India First Examination Report for IN Application 201914033592 dated Dec. 18, 2020.
China Notice of Allowance with English Translation for CN Application 201810968293.0 dated May 11, 2020.

* cited by examiner

DATA TRANSMISSION METHOD, ELECTRONIC DEVICE, AND COMPUTER READABLE STORAGE MEDIUM

CROSS-REFERENCE TO RELATED APPLICATION(S)

This application is a continuation application of U.S. application Ser. No. 16/522,290 filed on Jul. 25, 2019, which claims priority to Chinese Patent Application No. 201810968293.0, filed on Aug. 23, 2018, the entire contents of both of which are hereby incorporated by reference.

TECHNICAL FIELD

The present disclosure relates to but is not limited to the technical field of electronic devices, in particular to a data transmission method, an electronic device and a computer readable storage medium.

BACKGROUND

With the development of the mobile communication technology, users have more and more demands for data communication. At present, when intelligent terminals on the market send data, the cellular mobile network communication or the Wi-Fi communication is usually used for data transmission. Intelligent terminals need to compete with other devices in the same area for wireless link resources, which is difficult for users to meet online demand.

SUMMARY

Embodiments of the present disclosure provide a data transmission method, an electronic device, and a computer readable storage medium.

In a first aspect, an embodiment of the present disclosure provides a data transmission method, applied to an electronic device that uses multiple wireless communication links. The method includes: acquiring a first data packet to be sent; determining a first data stream to which the first data packet belongs; detecting a link state of the first data stream; and when the link state of the first data stream is an establishing state, and the first data packet is sent for the first time, selecting a first wireless communication link from the plurality of wireless communication links for the first data packet, and marking the first data packet according to a first link identifier of the first wireless communication link; and sending the first data packet through a network interface of the first wireless communication link according to the first link identifier.

In a second aspect, an embodiment of the present disclosure provides an electronic device including a processor, a memory, a communication interface, and one or more programs. The one or more programs are stored in the memory and configured to be executed by the processor. When instructions in the one or more programs are executed by the processor, the processor is caused to perform the following operations: acquiring a first data packet to be sent; determining a first data stream to which the first data packet belongs; detecting a link state of the first data stream; when the link state of the first data stream is an establishing state, and the first data packet is sent for the first time, selecting a first wireless communication link from the plurality of wireless communication links for the first data packet, and marking the first data packet according to a first link identifier of the first wireless communication link; and sending the first data packet through a network interface of the first wireless communication link according to the first link identifier.

In a third aspect, an embodiment of the present disclosure provides a computer readable storage medium. The computer readable storage medium stores a computer program, and the computer program is executable by a computer to perform the following operations: acquiring a first data packet to be sent; determining a first data stream to which the first data packet belongs; detecting a link state of the first data stream; when the link state of the first data stream is an establishing state, and the first data packet is sent for the first time, selecting a first wireless communication link from the plurality of wireless communication links for the first data packet, and marking the first data packet according to a first link identifier of the first wireless communication link; and sending the first data packet through a network interface of the first wireless communication link according to the first link identifier.

BRIEF DESCRIPTION OF DRAWINGS

The drawings are intended to provide a further understanding of the technical scheme of the present disclosure and form a part of the specification, and together with the embodiments of the present disclosure are used to explain the technical scheme of the present disclosure and do not constitute a limitation on the technical scheme of the present disclosure.

DETAILED DESCRIPTION

The technical schemes in the embodiments of the present disclosure are clearly and completely described in the following with reference to the drawings in the embodiments of the present disclosure. It is apparent that the embodiments described are only part, but not all, of the embodiments of the present disclosure. All other embodiments obtained by those skilled in the art based on the embodiments of the present disclosure without paying an inventive effort are within the protection scope of the present disclosure.

The terms "first", "second" and the like in the description and claims of the present disclosure and the drawings are used to distinguish different objects and not to describe a specific order. Furthermore, the term "comprise" and "have" and any variations thereof are intended to cover non-exclusive inclusion. For example, a process, a method, a system, a product, or a device that includes a series of acts or units is not limited to the listed acts or units, but may optionally further include acts or units not listed, or may optionally further include other acts or units inherent to the process, method, product, or device.

"An embodiment" mentioned herein means that a particular feature, structure, or characteristic described in connection with the embodiment may be included in at least one embodiment of the present disclosure. The appearance of the phrase in various places in the specification does not necessarily refer to the same embodiment, nor is an independent or alternative embodiment mutually exclusive of other embodiments. Those skilled in the art understand explicitly and implicitly that the embodiments described herein may be combined with other embodiments.

The electronic device involved in the embodiments of the present disclosure may be an electronic device with a data transmission capability, and the electronic device may include various devices with the wireless communication function, such as handheld devices, vehicle-mounted devices, wearable devices, computing devices or other processing devices connected to wireless modems, as well as various forms of User Equipment (UE), Mobile Stations (MS s), terminal devices, etc.

An embodiment of the present disclosure will be described in detail below.

A network identifier refers to identification information of a machine in a network. For a specific machine, an IP address and MAC address of the machine are the identifiers in the network. In the network, different layers have different identifiers. An identifier of a data link layer is the MAC address, an identifier of a network layer is the IP address, and an identifier of a transport layer is a port number of UDP or TCP. In the network, a name plus address of a host becomes a unique identifier.

A link identifier program refers to a program for detecting a link identifier of a specific link. When the other side may receive this request, for example, the other side accepts the detection request sent by an opposite side, then the other side will send a special physical signal to a link whose address is indicated by an address in the message (i.e. the detection request). This program allows the side sending the request to check whether there is a match between the two sides of the link.

The link identifier program is symmetrical and may be used at either side of the 2.048 Mb/s link. When the requests from an LE and AN conflict, the link identifier program started by the LE has a higher priority. The link identifier program may also be periodically executed by a system management. This link identifier program may also be applied after reassignment. After the system is started, the system management or Operating System (OS) may decide whether to run the link identifier program.

Figure 1:
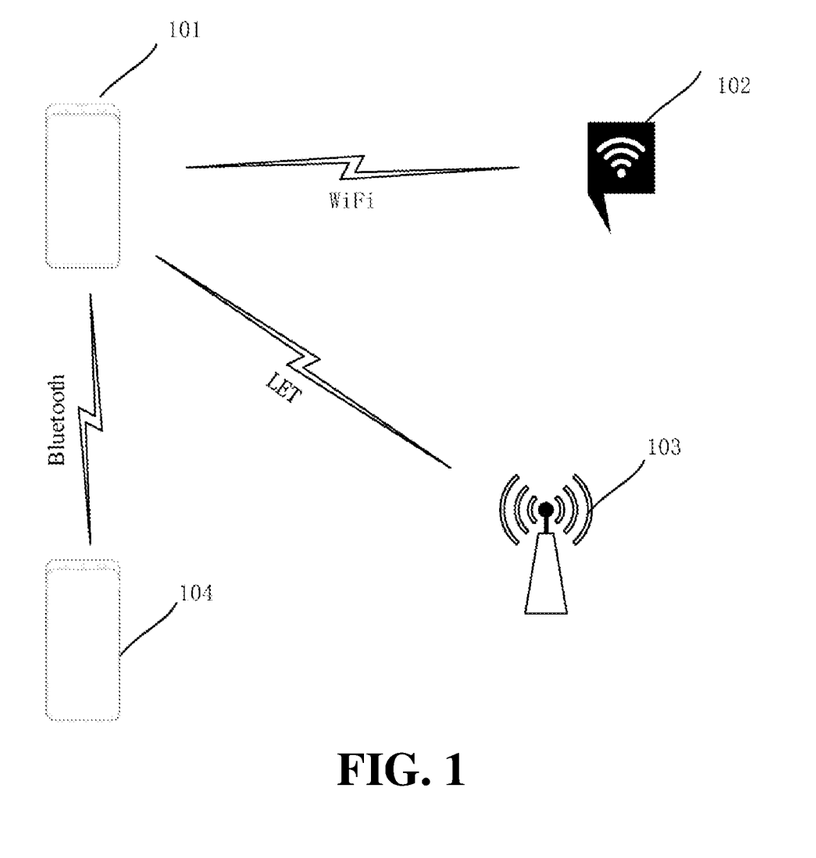
FIG. 1 is an exemplary system architecture diagram of a wireless communication system in which an electronic device is located provided by an embodiment of the present disclosure.

As shown in FIG. 1, the electronic device 101 described in the present disclosure may be connected to a data network 103, which is a communication network for transmitting data services. The electronic device 101 described in the present disclosure may be connected to a Wi-Fi 102, which is a technology that allows electronic devices to connect to a wireless local area network, usually by using 2.4G UHF or 5G SHF ISM radio frequency band. The electronic device 101 described in the present disclosure may further be connected to Bluetooth 104, which is a wireless technology standard that may realize short-distance data exchange between fixed devices, mobile devices and a building personal area network, or the like.

Figure 2:
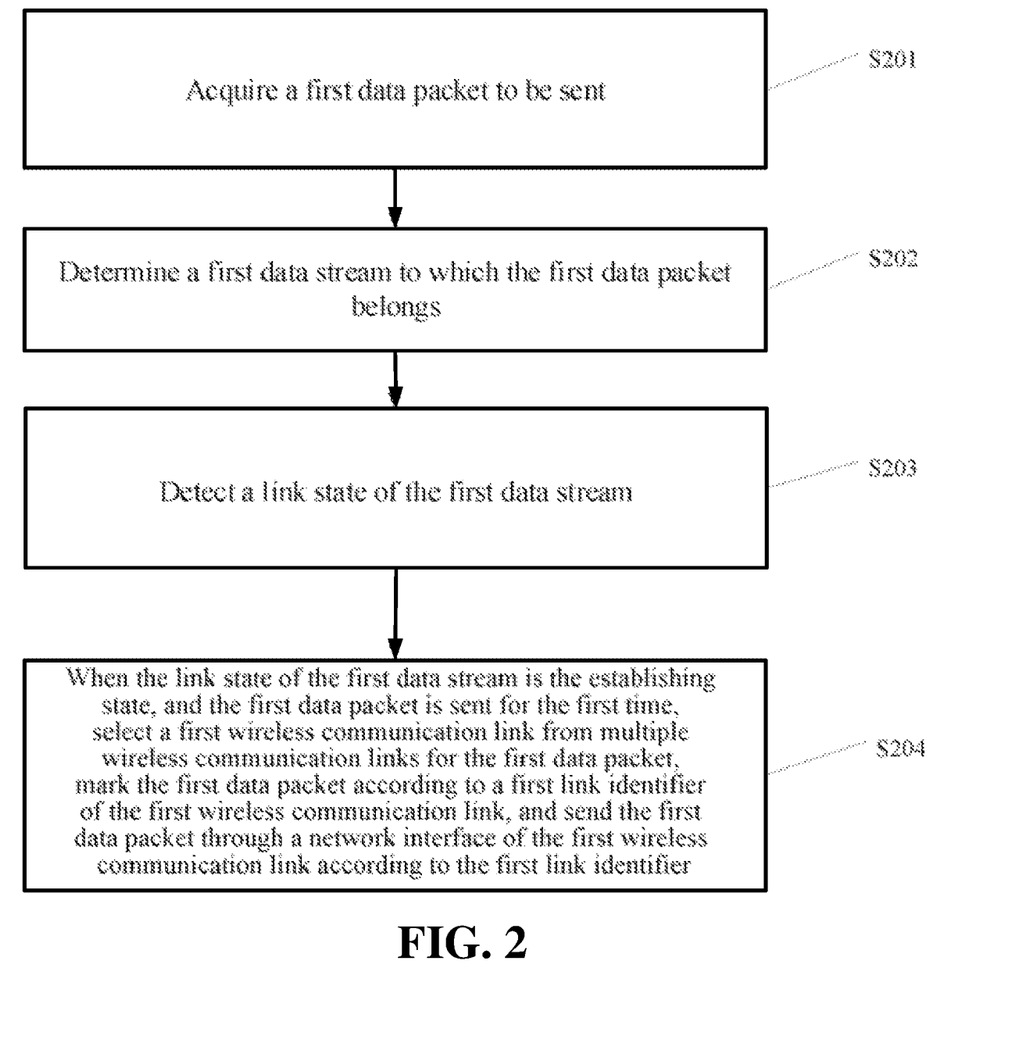
FIG. 2 is a flow chart of a data transmission method provided by an embodiment of the present disclosure.

Please refer to FIG. 2, which is a flow chart of a data transmission method provided by an embodiment of the present disclosure. The data transmission method is applied to an electronic device. As shown in the figure, the data transmission method includes the following S201 to S204.

In S201, an electronic device acquires a first data packet to be sent.

In S202, the electronic device determines a first data stream to which the first data packet belongs.

Herein, the first data stream is a data stream in a first data stream set of the electronic device, the first data stream set is a data stream set in multiple data stream sets, and the data stream to which the data packet belongs is determined according to a ct pointer on the data packet.

In S203, the electronic device detects a link state of the first data stream.

In a possible example, the link state includes an establishing state for indicating that a server has not responded to the first data stream.

In a possible example, the link state further includes an established state for indicating that the server has responded to the first data stream.

The establishing state is used for indicating that the server has not responded to the first data stream, which means that the electronic device sent the first message (SYN handshake signal) of the first data stream but has not received a reply from the server. The established state is used for indicating that the server has responded to the first data stream, which means that the electronic device sent the first message (SYN handshake signal) of the first data stream and the server has replied the electric device. Optionally, the established state may also be used for indicating that the server has responded to the first data stream, which means that the electronic device sent the first message of the first data stream, the server has replied to the electronic device, and then the electronic device responded to the server.

In S204, when the link state of the first data stream is the establishing state, and the first data packet is sent for the first time, the electronic device selects a first wireless communication link from multiple wireless communication links for the first data packet, and marks the first data packet according to a first link identifier of the first wireless communication link; and sends the first data packet through a network interface of the first wireless communication link according to the first link identifier.

In a possible example, when the first data packet is sent for the first time, a first wireless communication link is selected for the first data packet from multiple wireless communication links, then a link identifier is assigned to the first data packet, and then the first data packet assigns the link identifier to the ct pointer, and finally the first data packet is sent. For example, for a skb packet, the first wireless communication link selected by the electronic device is Wi-Fi, and the electronic device performs the following operations: skb→mark=wlan_mark, ct→mark=skb→mark, and finally a network interface of the first wireless communication link is selected according to the first link identifier to send the first data packet.

In a possible example, after selecting the first wireless communication link for the first data packet, the electronic device stores a correspondence relationship between the first data stream to which the first data packet belongs and the first wireless communication link, and then other data packets of the first data stream may be marked according to the identifier of the first wireless communication link, and further the electronic device selects the network interface of the first wireless communication link to send other data packets of the first data stream.

It can be seen that in the embodiments of the present disclosure, after the electronic device acquires the first data packet to be sent, firstly the electronic device determines the first data stream to which the first data packet belongs. Secondly, a link state of the first data stream is detected. Finally, when the link state of the first data stream is the establishing state, and the first data packet is sent for the first time, a first wireless communication link is selected for the first data packet from multiple wireless communication links, and the first data packet is marked according to a first link identifier of the first wireless communication link; and the first data packet is sent through a network interface of the first wireless communication link according to the first link identifier. It can be seen that in the embodiments of the present disclosure, the electronic device may select the first wireless communication link for the first data packet from multiple wireless communication links with respect to the non-retransmission data packet in the data stream in the establishing state, and mark the first data packet according to the link identifier of the first wireless communication link, so that the corresponding network interface may be directly used to send the first data packet according to the link identifier during subsequent sending. Therefore the transmission efficiency is prevented from being affected inversely due to link instability under a condition that all data packets are only sent through the same network interface, thus being beneficial to improving the data transmission efficiency of the electronic device.

In a possible example, the data transmission method includes: when the link state of the first data stream is the establishing state, a second link identifier of a second wireless communication link is selected to mark the first data packet when the first data packet is not sent for the first time, and the first data packet is sent through a network interface of the second wireless communication link according to the second link identifier. The second wireless communication link is a wireless communication link different from the first wireless communication link. In a possible example, after selecting the second wireless communication link for the first data packet, the electronic device updates the stored correspondence relationship between the first data stream to which the stored first data packet belongs and the wireless communication link, i.e., replaces the previously stored first wireless communication link with the second wireless communication link, and stores a correspondence relationship between the first data stream and the second wireless communication link. Then the electronic device may mark other data packets of the first data stream according to an identifier of the second wireless communication link, and further selects the network interface of the second wireless communication link to send other data packets of the first data stream.

A case where the first data packet is not sent for the first time means that the electronic device has sent the first message (SYN handshake signal) to the server but has not received a response from the server, which may be caused by a poor channel quality of the first wireless communication link to which the first data packet belongs. In this case, the electronic device will select other wireless communication links except the first wireless communication link according to the wireless modules of the electronic device.

It is apparent that in this example, the electronic device may exclude the first wireless communication link used by the first data packet based on the wireless communication module of the electronic device and select other wireless communication links to transmit data, thus ensuring the timeliness and efficiency of data transmission.

In a possible example, the data transmission method includes: when the link state of the first data stream is the established state, the first data packet is marked according to a link identifier of the first data stream, and a network interface of a mapped wireless communication link is selected according to the link identifier of the first data packet to transmit the first data packet.

Herein, the established state refers to that during the establishment of a normal TCP network connection between the electronic device and the server, the electronic device firstly sends a SYN message, then the server uses an ACK response to indicate receipt of the message, and thus a link connection between the electronic device and the server is established. Optionally, the established state refers to that during the establishment of a normal TCP network connection between the electronic device and the server, the electronic device firstly sends a SYN message, then the server uses a SYN plus ACK response to indicate receipt of the message, and finally the electronic device responds with the ACK message. In this way, a reliable TCP connection may be established between the electronic device and the server, and then data may be transferred between the client and the server. After it is determined whether the reliable connection is established, whether the first data packet is complete will be determined. When the first data packet is incomplete or damaged, it will be returned. When the first data packet is complete, the link ct pointer value is assigned to the first data packet. For example, for a complete skb data packet, the electronic device has established a normal connection with the server, and a skb→mark=ct→mark processing is required to be performed when the data packet is sent.

It can be seen that the determination of the connection between the electronic device and the server and the determination of whether the data packet is complete can avoid erroneous data transmission and improve the efficiency of data transmission.

In a possible example, selecting the first wireless communication link from multiple wireless communication links for the first data packet includes: a preset correspondence relationship is queried to determine the first wireless communication link corresponding to the first data stream. Herein, the correspondence relationship includes a correspondence relationship between data streams and multiple wireless communication links.

In a possible example, the data streams are data streams of at least one data transmission task of the electronic device, each data transmission task is associated with an application started by the electronic device, and each data transmission task includes one or more data streams.

Herein, the preset correspondence relationship refers to a correspondence relationship previously configured by a user or a correspondence relationship customized by the electronic device. The correspondence relationship previously configured by the user may be the correspondence relationship between parameters of the data streams like types or the number of data transmission tasks and one or more wireless communication links. For example, for a data stream of a certain task type, the user may configure previously multiple wireless communication links corresponding to the data stream of the task type, and configure an order of the multiple wireless communication links. For example, the wireless communication link first in order is preferentially selected for the data stream of the task type, and when the wireless communication link first in order fails, a wireless communication link second in order is selected for the data stream of the task type. For another example, user may previously configure that wireless communication link I corresponds to data stream with big data amount such as larger than 1G, and wireless communication link II corresponds to data streams with small data amount such as smaller than 1G. The parameters of the data streams can also be other values such as security level, importance level, and so on.

The correspondence relationship customized by the electronic device means that the wireless communication link to be used is selected preferentially by electronic devices out of the configuration of the user, and this correspondence relationship is the default correspondence relationship in the electronic device. The default correspondence relationship in the electronic device can be similar to the correspondence relationship previously configured by the user, that is, the correspondence relationship between parameters of the data streams and one or more wireless communication links. The default correspondence relationship in the electronic device can also include only the order of the wireless communication links. That is, when the default correspondence relationship is used for selecting the wireless communication link for the data stream, the wireless communication link is selected according to the order of the wireless communication links. For example, when the wireless communication link first in order is selected as the first wireless communication link, there is no need to select other wireless communication links. However, if the wireless communication link first in order could not be the first wireless communication link, the wireless communication link second in order could be selected to make a try, until one wireless communication link is used as the first wireless communication link successfully or all the wireless communication links have been selected.

In a possible example, when there is no correspondence relationship previously configured by the user or no corresponding wireless communication link is found according to the correspondence relationship previously configured by the user, the electronic device may select the wireless communication link according to the default correspondence relationship in the electronic device.

In this example, the first wireless communication link corresponding to the first data stream to be transmitted by the electronic device may be configured by the user or may be selected preferentially by the electronic device, for example, the wireless communication link could be selected according to the channel quality from high to low in sequence, thus avoiding the use of wireless communication links with poor channel quality, and improving the transmission rate of data transmission.

In a possible example, the selection of the second wireless communication link can be done in reference to the selection of the first wireless communication link, and is not repeated here.

In a possible example, before the first data packet to be sent is acquired, the method further includes: the preset correspondence relationship is established according to a preset data stream splitting strategy.

Herein, the data stream splitting policy may be preset by the user or customized by the electronic device. The customization could be that the manufacturer of the electronic device previously configures the data stream splitting policy into the electronic device. In a possible example, the user and the electronic device may not directly preset the correspondence relationship, but preset the data stream splitting strategy. When the data stream needs to be sent, the electronic device establishes a correspondence relationship between the data stream and the wireless communication link according to the preset data stream splitting strategy.

The data stream splitting strategy includes: splitting data streams according to data transmission task types, channel quality parameters of wireless communication links, etc.

In this example, the electronic device may effectively improve the stability and transmission rate of the target data transmission task by transmitting the data transmission task in a splitting manner.

In a possible example, establishing the preset correspondence relationship according to a preset data stream splitting strategy includes: channel quality parameters of each wireless communication link in multiple wireless communication links are determined, herein the channel quality parameters include at least one of a transmission delay and a transmission rate; and the preset correspondence relationship between the data streams and the wireless communication links are established according to the channel quality parameters of the wireless communication links and preset parameters of the data streams. For example, data streams of at least one data transmission task are assigned according to the channel quality parameters of the wireless communication links and preset parameters of the data streams to obtain the preset correspondence relationship.

Herein, the preset parameters of the data streams include a data amount, a type, an importance and a security of the data streams, and the security includes payment information, verification information and other information. The larger the data amount in a data stream, the better the channel quality parameter of the wireless communication link that may be matched. For data streams with higher importance and higher security requirements, wireless communication links with better channel quality parameter should be selected to ensure accurate data transmission.

In this example, the electronic device may determine the correspondence relationship between the data transmission task and the wireless communication link, and then perform a data transmission according to the number of channels and the channel quality parameter of the wireless communication module. According to the channel quality parameter of the wireless communication links, an optimal wireless communication link is selected to be assigned to a data stream of at least one data transmission task, thereby ensuring the improvement of the data transmission rate and the safety of the data transmission.

In a possible example, establishing the preset correspondence relationship according to the preset data stream splitting strategy includes: device capability information of the wireless communication module of the electronic device is determined; and the preset correspondence relationship between the data streams and the wireless communication links are established according to the device capability information of the wireless communication module and preset parameters of the data streams. For example, according to the device capability information of the wireless communication module and the preset parameters of a data stream, a wireless communication module whose device capability information is suitable for the preset parameters of the data stream is selected, and a correspondence relationship between the data stream and a wireless communication link corresponding to the wireless communication module is established, so that the preset correspondence relationship is obtained.

The device capability information of the wireless communication module refers to parameters such as hardware parameters of the wireless communication module, a channel capacity of wireless communication, etc. In actual operations, for example, listening to music and uploading big data files and the like, three adaptive wireless communication modules are selected according to the three data transmission task types. During selection, big data match high-quality channels for data transmission, and small data match poor channels for data transmission.

For the selection of the wireless communication module, network charges will also be taken into account, and the data transmission task of big data may be transmitted through Wi-Fi. Data transmission tasks with small data amount may be transmitted through the LTE based on traffic charging.

It can be seen that the electronic device can select preferentially the wireless communication module according to the capability information of the wireless communication module, which can ensure that the transmission capability matches with the transmission task, avoid waste and reduction of the transmission rate, and ensure the low cost and transmission efficiency of data transmission.

In a possible example, the preset parameters include at least one of the following: a data amount, a type, a priority. The priority includes at least one of the following: an importance level, a task type level associated with a foreground, and a security level.

It can be seen that in this example, the electronic device can preset parameters to transmit data for the data transmission task, thus ensuring the improvement of data transmission rate and the safety of data transmission.

In a possible example, the first data packet is a data packet generated by a local end of the electronic device; or, the first data packet is a data packet to be forwarded received by the electronic device.

In a possible example, the first data packet is a data packet generated by the electronic device; or, the first data packet is a data packet received by the electronic device.

It can be seen that the electronic device can not only transmit the data packets generated by the present device, but also forward the data packets, thus ensuring the diversity of data transmission tasks.

Figure 3:
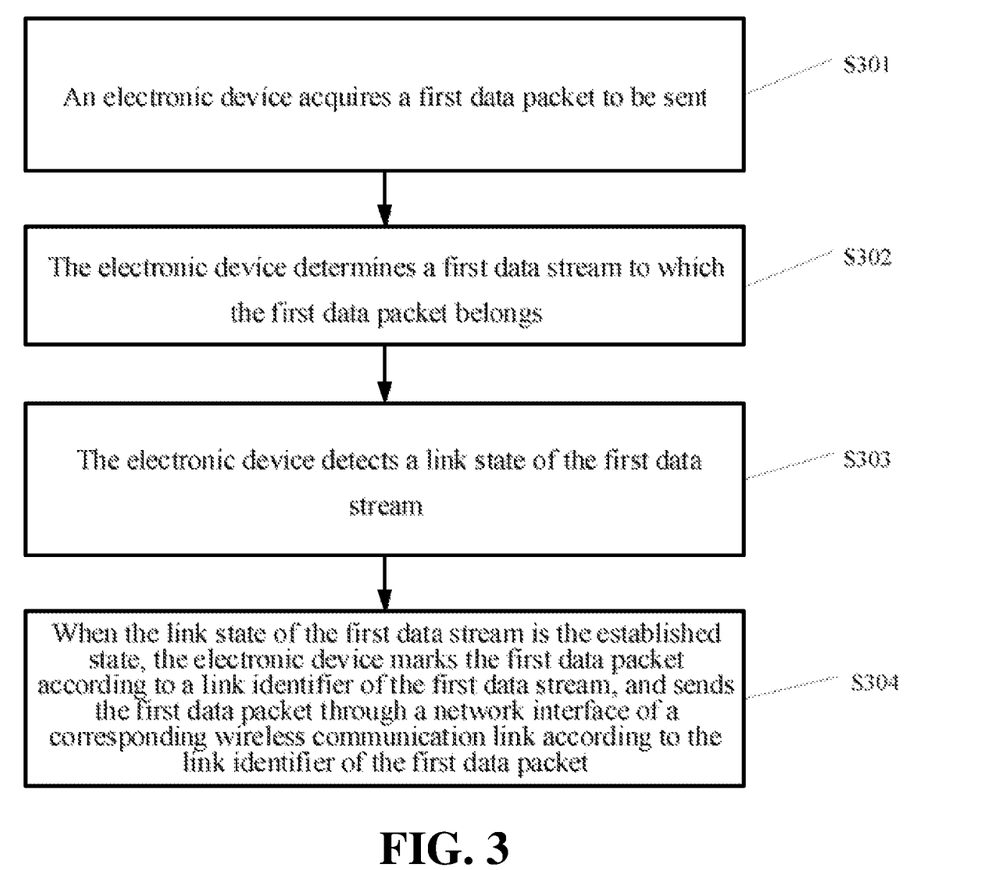
FIG. 3 is a flow chart of another data transmission method provided by an embodiment of the present disclosure.

Consistent with the above embodiments shown in FIG. 2, please refer to FIG. 3, which is a flow chart of a data transmission method provided by an embodiment of the present disclosure. The data transmission method is applied to an electronic device as shown in FIG. 1. As shown in the figure, the data transmission method includes the following S301 to S304.

In S301, an electronic device acquires a first data packet to be sent.

In S302, the electronic device determines a first data stream to which the first data packet belongs.

In S303, the electronic device detects a link state of the first data stream.

In a possible example, the link state includes an establishing state for indicating that a server has not responded to the first data stream. In another possible example, the link state further includes an established state for indicating that the server has responded to the first data stream.

In S304, when the link state of the first data stream is the established state, the electronic device marks the first data packet according to a link identifier of the first data stream, and sends the first data packet through a network interface of a corresponding wireless communication link according to the link identifier of the first data packet.

It can be seen that in the embodiments of the present disclosure, after the electronic device acquires the first data packet to be sent, firstly the electronic device determines the first data stream to which the first data packet belongs. Secondly, a link state of the first data stream is detected. Finally, when the link state of the first data stream is the establishing state, and the first data packet is sent for the first time, a first wireless communication link is selected for the first data packet from multiple wireless communication links, and the first data packet is marked according to a first link identifier of the first wireless communication link; and a network interface of the first wireless communication link is selected according to the first link identifier to send the first data packet. It can be seen that in the embodiments of the present disclosure, the electronic device may select the first wireless communication link for the first data packet from multiple wireless communication links with respect to the non-retransmission data packet in the data stream in the establishing state, and mark the first data packet according to the link identifier of the first wireless communication link, so that the corresponding network interface may be directly used to send the first data packet according to the link identifier during subsequent sending. Therefore, the transmission efficiency is prevented from being affected inversely due to link instability under a condition that all data packets are only sent through the same network interface, thus being beneficial to improving the data transmission efficiency of the electronic device.

Figure 4:
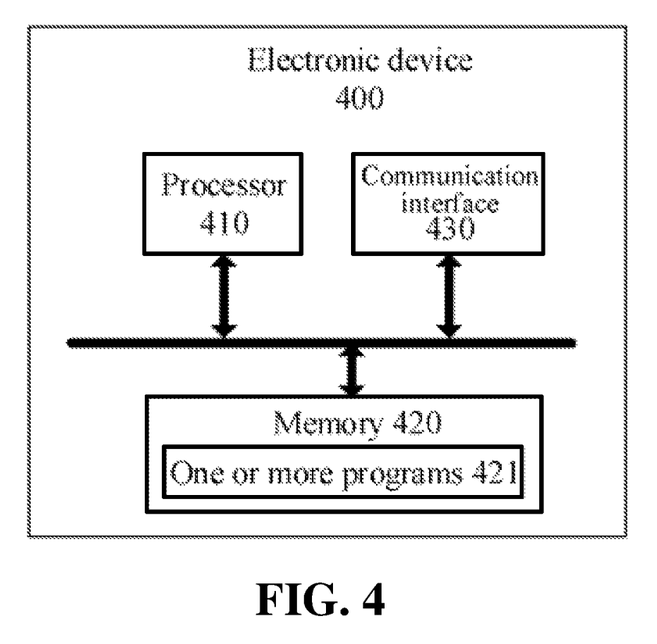
FIG. 4 is a schematic structural diagram of an electronic device provided by an embodiment of the present disclosure.

Consistent with the embodiments shown in FIGS. 2 and 3 above, please refer to FIG. 4, which is a structural diagram of an electronic device 400 provided by an embodiment of the present disclosure. As shown in the figure, the electronic device 400 includes a processor 410 such as an application processor, a memory 420, a communication interface 430, and one or more programs 421. The one or more programs 421 are stored in the memory 420 and configured to be executed by the processor 410.

The one or more programs 421 include instructions for executing the following acts: acquiring a first data packet to be sent; determining a first data stream to which the first data packet belongs; detecting a link state of the first data stream; when the link state of the first data stream is an establishing state, and the first data packet is sent for the first time, selecting a first wireless communication link from the plurality of wireless communication links for the first data packet, and marking the first data packet according to a first link identifier of the first wireless communication link; and sending the first data packet through a network interface of the first wireless communication link according to the first link identifier.

In a possible example, the establishing state is used for indicating that a server has not responded to the first data stream.

In the embodiments of the present disclosure, after the electronic device acquires the first data packet to be sent, firstly the electronic device determines the first data stream to which the first data packet belongs. Secondly, a link state of the first data stream is detected. Finally, when the link state of the first data stream is the establishing state, and the first data packet is sent for the first time, a first wireless communication link is selected for the first data packet from multiple wireless communication links, and the first data packet is marked according to a first link identifier of the first wireless communication link; and a network interface of the first wireless communication link is selected according to the first link identifier to send the first data packet. It can be seen that in the embodiments of the present disclosure, the electronic device may select the first wireless communication link for the first data packet from multiple wireless communication links with respect to the non-retransmission data packet in the data stream in the establishing state, and mark the first data packet according to the link identifier of the first wireless communication link, so that the corresponding network interface may be directly used to send the first data packet according to the link identifier during subsequent sending. Therefore, the transmission efficiency is prevented from being affected inversely due to link instability under a condition that all data packets are only sent through the same network interface, thus being beneficial to improving the data transmission efficiency of the electronic device.

In a possible example, the program further includes instructions for performing the following operations: when the first data packet is not sent for the first time, selecting a second link identifier of a second wireless communication link to mark the first data packet, and sending the first data packet through a network interface of the second wireless communication link according to the second link identifier. The second wireless communication link is a wireless communication link different from the first wireless communication link.

In a possible example, the program further includes instructions for performing the following operations: when the link state of the first data stream is the established state, marking the first data packet according to a link identifier of the first data stream, and selecting a network interface of a mapped wireless communication link according to the link identifier of the first data packet to transmit the first data packet. Herein the established state is used for indicating that the server has responded to the first data stream.

In a possible example, selecting the first wireless communication link from multiple wireless communication links for the first data packet includes: querying a preset correspondence relationship to determine the first wireless communication link corresponding to the first data stream. Herein, the correspondence relationship includes a correspondence relationship between data streams and multiple wireless communication links. In a possible example, the data streams are data streams of at least one data transmission task of the electronic device, each data transmission task is associated with an application started by the electronic device, and each data transmission task includes one or more data streams.

In a possible example, the instructions in the program are also used to perform the following operations: establishing the preset correspondence relationship according to a preset data stream splitting strategy.

In a possible example, in the aspect of establishing the preset correspondence relationship according to the preset data stream splitting strategy, the instructions in the program are specifically used for performing the following operations: determining channel quality parameters of each wireless communication link in multiple wireless communication links, herein the channel quality parameters include at least one of a transmission delay and a transmission rate; and establishing the preset correspondence relationship between the data streams and the wireless communication links according to the channel quality parameters of the wireless communication links and preset parameters of the data streams. For example, a wireless communication link with suitable channel quality parameters is matched according to the preset parameters of a data stream, and the data streams are divided in this way to obtain the preset correspondence relationship.

In a possible example, in the aspect of establishing the preset correspondence relationship according to the preset data stream splitting strategy, the instructions in the program are specifically used for performing the following operations: determining device capability information of the wireless communication module of the electronic device; and establishing the preset correspondence relationship between the data streams and the wireless communication links according to the device capability information of the wireless communication module and preset parameters of the data streams. For example, a wireless communication module with suitable device capability information is matched according to the preset parameters of a data stream, and the correspondence relationship between the data stream and the wireless communication links corresponding to the wireless communication module is established. The preset correspondence relationship could be obtained in this way.

In a possible example, the preset parameters include at least one of the following: a data amount, a type, a priority. The priority includes at least one of: an importance level, a task type level associated with a foreground, and a security level.

In a possible example, the first data packet is a data packet generated by a local end of the electronic device; or, the first data packet is a data packet to be forwarded received by the electronic device.

In a possible example, the first data packet is a data packet generated by the electronic device; or, the first data packet is a data packet received by the electronic device.

In a possible example, the preset correspondence relationship includes a correspondence relationship previously configured by a user and a default correspondence in the electronic device. The instructions in the program are further used for performing the following operations: when there is no correspondence relationship previously configured by the user or no wireless communication link corresponding to the first data packet is found according to the correspondence relationship previously configured by the user, determining the wireless communication link corresponding to the first data packet according to the default correspondence relationship in the electronic device to obtain the first wireless communication link.

In a possible example, the preset correspondence relationship includes a correspondence relationship between the wireless communication links and preset parameters of the data streams. Selecting the first wireless communication link from the plurality of wireless communication links for the first data packet includes: querying the preset correspondence relationship according to values of the preset parameters of the first data stream, and determining the first wireless communication link corresponding to the values of the preset parameters of the first data stream.

In a possible example, the default correspondence relationship in the electronic device includes an order of the plurality of wireless communication links. Determining the first wireless communication link corresponding to the first data packet according to the default correspondence relationship in the electronic device includes: selecting a wireless communication link according to the order of the plurality of wireless communication links as the first wireless communication link.

The scheme of the embodiment of the present disclosure is mainly introduced above from a perspective of the execution process of the method side. It can be understood that to realize the above-mentioned functions, the electronic device includes corresponding hardware structures and/or software modules for performing various functions. Those skilled in the art should easily recognize that the present disclosure may be implemented in hardware or a combination of hardware and computer software in combination with the units and algorithm acts of the examples described in the embodiments provided herein. Whether a certain function is implemented by hardware or by computer software driving hardware depends on the specific application and design constraints of the technical scheme. Skilled artisans may use different methods to implement the described functions in respect to each particular application, but such implementation should not be considered to be beyond the scope of the present disclosure.

The embodiments of the present disclosure may divide the electronic device into functional units according to the above method examples, for example, each functional unit may be divided to correspond to each function, or two or more functions may be integrated into one processing unit. The above integrated unit can be implemented in a form of hardware, or can be implemented in a form of software function unit. It should be noted that the division of units in the embodiments of the present disclosure is schematic and is only a logic function division, and there may be other division modes in actual implementation.

Figure 5:
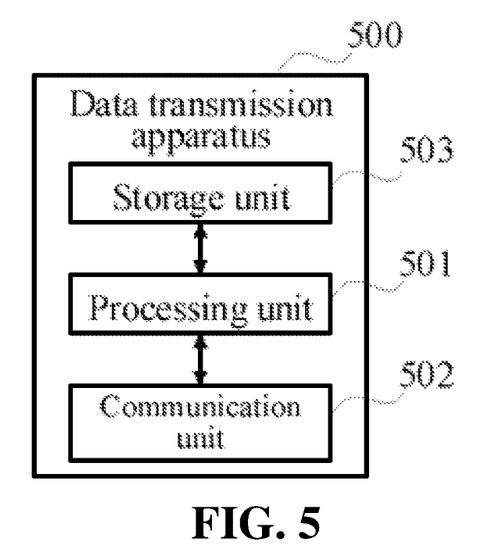
FIG. 5 is a function unit block diagram of a data transmission apparatus provided by an embodiment of the present disclosure.

FIG. 5 is a function unit block diagram of a data transmission apparatus 500 involved by an embodiment of the present disclosure. The data transmission apparatus 500 is applied to an electronic device, and includes a processing unit 501 and a communication unit 502.

The processing unit 501 is used for acquiring a first data packet to be sent through the communication unit 502, determining a first data stream to which the first data packet belongs; detecting a link state of the first data stream; and when the link state of the first data stream is the establishing state and the first data packet is sent for the first time, selecting a first wireless communication link from multiple wireless communication links for the first data packet, and marking the first data packet according to a first link identifier of the first wireless communication link; and sending the first data packet through a network interface of the first wireless communication link according to the first link identifier through the communication unit.

The data transmission device 500 may further include a storage unit 503 for storing program codes and data of the electronic device. The processing unit 501 may be a processor, the communication unit 502 may be a touch display screen or a transceiver, and the storage unit 503 may be a memory.

It can be seen that in the embodiments of the present disclosure, after the electronic device acquires the first data packet to be sent, firstly the electronic device determines the first data stream to which the first data packet belongs. Secondly, a link state of the first data stream is detected. Finally, when the link state of the first data stream is the establishing state, and the first data packet is sent for the first time, a first wireless communication link is selected for the first data packet from multiple wireless communication links, and the first data packet is marked according to a first link identifier of the first wireless communication link; and a network interface of the first wireless communication link is selected according to the first link identifier to send the first data packet. Therefore, the present disclosure is beneficial for reducing time consumption of data transmission, lowering the network latency, and improving the transmission efficiency.

In a possible example, the establishing state is used for indicating that a server has not responded to the first data stream.

In a possible example, the processing unit 501 is specifically used for: when the link state of the first data stream is the establishing state, and the first data packet is not sent for the first time, selecting a second link identifier of a second wireless communication link to mark the first data packet, and selecting a network interface of the second wireless communication link to send the first data packet according to the second link identifier. The second wireless communication link is a wireless communication link different from the first wireless communication link.

In a possible example, the processing unit 501 is specifically used for, when the link state of the first data stream is the established state, marking the first data packet according to a link identifier of the first data stream, and sending the first data packet through a network interface of a corresponding wireless communication link according to the link identifier of the first data packet. Herein, the established state is used for indicating that the server has responded to the first data stream.

In a possible example, in the aspect of selecting the first wireless communication link from multiple wireless communication links for the first data packet, the processing unit 501 is specifically used for querying a preset correspondence relationship to determine the first wireless communication link corresponding to the first data stream. Herein, the correspondence relationship includes a correspondence relationship between data streams and multiple wireless communication links. In a possible example, the data streams are data streams of at least one data transmission task of the electronic device, each data transmission task is associated with an application started by the electronic device, and each data transmission task includes one or more data streams.

In a possible example, the processing unit 501 is specifically used for establishing the preset correspondence relationship according to a preset data stream splitting strategy.

In a possible example, in the aspect of establishing the preset correspondence relationship according to a preset data stream splitting strategy, the processing unit 501 is specifically used for determining channel quality parameters of each wireless communication link in multiple wireless communication links, herein the channel quality parameters include at least one of a transmission delay and a transmission rate; and establishing the preset correspondence relationship between the data streams and the wireless communication links according to the channel quality parameters of the wireless communication links and preset parameters of the data streams.

In a possible example, in the aspect of establishing the preset correspondence relationship according to a preset data stream splitting strategy, the processing unit 501 is specifically used for determining device capability information of the wireless communication module of the electronic device, and establishing the preset correspondence relationship between the data streams and the wireless communication links according to the device capability information of the wireless communication module and preset parameters of the data streams. For example, a suitable wireless communication module is selected for a data stream based on the device capability information of the wireless communication module and the preset parameters of the data stream, and then a correspondence relationship between the data stream and the wireless communication link corresponding to the wireless communication module is established.

In a possible example, the preset parameters include at least one of data amount, data type, priority, and the priority includes at least one of importance level, task type level, and security level.

In a possible example, the first data packet is a data packet generated by the electronic device; or, the first data packet is a data packet received by the electronic device.

In a possible example, the preset correspondence relationship includes a correspondence relationship previously configured by a user and a default correspondence relationship in the electronic device. In the aspect of selecting the first wireless communication link from multiple wireless communication links for the first data packet, the processing unit 501 is specifically used for, when there is no correspondence relationship previously configured by the user or there is no wireless communication link corresponding to the first data packet found according to the correspondence relationship previously configured by the user, determining the wireless communication link corresponding to the first data packet according to the default correspondence relationship in the electronic device.

In a possible example, the preset correspondence relationship includes a correspondence relationship between the wireless communication links and preset parameters of the data streams. In the aspect of selecting the first wireless communication link from the plurality of wireless communication links for the first data packet, the processing unit 501 is specifically used for querying the preset correspondence relationship according to values of the preset parameters of the first data stream, and determining the first wireless communication link corresponding to the values of the preset parameters of the first data stream.

In a possible example, the default correspondence relationship in the electronic device includes an order of the plurality of wireless communication links. In the aspect of determining the first wireless communication link corresponding to the first data packet according to the default correspondence relationship in the electronic device, the processing unit 501 is specifically used for: selecting a wireless communication link according to the order of the plurality of wireless communication links as the first wireless communication link.

An embodiment of the present disclosure also provides a computer storage medium. Herein, the computer storage medium stores a computer program for electronic data exchange, and the computer program causes a computer to perform some or all of the acts of any method described in the above method embodiments. The computer includes the electronic device.

An embodiment of the present disclosure also provides a computer program product including a non-transitory computer readable storage medium storing a computer program. The computer program is operable to cause a computer to perform some or all of the acts of any method described in the above method embodiments. The computer program product may be a software installation package, and the computer includes the electronic device.

In the embodiments of the present disclosure, after the electronic device acquires the first data packet to be sent, firstly the electronic device determines the first data stream to which the first data packet belongs. Secondly, a link state of the first data stream is detected. Finally, when the link state of the first data stream is the establishing state, and the first data packet is sent for the first time, a first wireless communication link is selected for the first data packet from multiple wireless communication links, and the first data packet is marked according to a first link identifier of the first wireless communication link; and a network interface of the first wireless communication link is selected according to the first link identifier to send the first data packet. It can be seen that in the embodiments of the present disclosure, the electronic device may select the first wireless communication link for the first data packet from multiple wireless communication links with respect to the non-retransmission data packet in the data stream in the establishing state, and mark the first data packet according to the link identifier of the first wireless communication link, so that the corresponding network interface may be directly used to send the first data packet according to the link identifier during subsequent sending. Therefore, the transmission efficiency is prevented from being affected inversely due to link instability under a condition that all data packets are only sent through the same network interface, thus being beneficial to improving the data transmission efficiency of the electronic device.

It should be noted that for the sake of simple description, the aforementioned method embodiments are all expressed as a series of action combinations, but those skilled in the art should understand that the present disclosure is not limited by the sequence of described actions, because some acts may be performed in other sequences or simultaneously according to the present disclosure. Secondly, those skilled in the art should also understand that the embodiments described in the specification are all alternative embodiments, and the actions and modules involved are not necessarily required by the present disclosure.

In the above-mentioned embodiments, the description of each embodiment has its own emphasis. For parts not detailed in one embodiment, please refer to the related description of other embodiments.

In several embodiments provided by the present invention, it should be understood that the disclosed devices may be implemented in other ways. For example, the device embodiments described above are only illustrative, e.g., the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, device or unit, and may be in electrical, or other forms.

The unit described as a separate part may or may not be physically separated, and the component shown as a unit may or may not be a physical unit, i.e., it may be located in one place or may be allocated over multiple network units. Some or all of the elements can be selected according to actual needs to achieve the purpose of the embodiment of the present invention.

In addition, various functional units in various embodiments of the present disclosure may be integrated in one processing unit, or they may be physically present in each unit alone, or two or more units may be integrated in one unit. The above integrated unit can be implemented in a form of hardware, or can be implemented in a form of software function unit.

The integrated units may be stored in a computer readable storage when implemented in the form of software functional units and sold or used as separate products. Based on this understanding, the technical scheme of the present disclosure, in essence, or the part contributing to the prior art, or all or the part of the technical scheme, may be embodied in the form of a software product stored in a storage, including a variety of instructions for causing a computer device (which may be a personal computer, a server, or a network device) to perform all or part of the acts of the method described in various embodiments of the present disclosure. The aforementioned storage includes a U disk, a read-only memory (ROM), a random access memory (RAM), a mobile hard disk, a magnetic disk or an optical disk, and other medium capable of storing program codes.

One of ordinary skill in the art can understand that all or part of the acts in the various methods of the above-mentioned embodiments may be completed by instructing relevant hardware through a program may be stored in a computer readable memory. The memory may include a flash disk, a Read-Only Memory (ROM), a Random Access Memory (RAM), a magnetic disk or an optical disk, etc.

The above-mentioned embodiments of the present disclosure are described in detail. Specific examples herein are applied to explain the principle and implementation mode of the present disclosure. The description of the above-mentioned embodiments is only used for helping understand the methods and core ideas of the present disclosure. For ordinary technicians in the art, there will be changes in the specific implementation and disclosure scope according to the idea of the present disclosure. To sum up, the contents of the present specification should not be considered as limiting the present disclosure.

What is claimed is:

1. A method for data transmission, applied to an electronic device that uses a plurality of wireless communication links, the method comprising:
   acquiring a first data packet to be sent;
   determining a first data stream to which the first data packet belongs;
   detecting a link state of the first data stream;
   when the link state of the first data stream is an establishing state and the first data packet is sent for a first time, selecting a first wireless communication link from the plurality of wireless communication links for the first data packet, and marking the first data packet according to a first link identifier of the first wireless communication link; and
   sending the first data packet through a network interface of the first wireless communication link according to the first link identifier;
   wherein selecting the first wireless communication link from the plurality of wireless communication links for the first data packet comprises:
      querying a preset correspondence relationship to determine the first wireless communication link corresponding to the first data stream, wherein the preset correspondence relationship comprises a correspondence relationship between data streams and the plurality of wireless communication links and a correspondence relationship previously configured by a user and a default correspondence relationship in the electronic device; and
      when there is no correspondence relationship previously configured by the user or there is no wireless communication link corresponding to the first data packet found according to the correspondence relationship previously configured by the user, determining the first wireless communication link corresponding to the first data packet according to the default correspondence relationship in the electronic device;
   wherein the default correspondence relationship in the electronic device comprises an order of the plurality of wireless communication links; and
   wherein determining the first wireless communication link corresponding to the first data packet according to the default correspondence relationship in the electronic device comprises:
      selecting a wireless communication link according to the order of the plurality of wireless communication links as the first wireless communication link.

2. The method according to claim 1, further comprising:
   when the link state of the first data stream is an established state, marking the first data packet according to a link identifier of the first data stream, and sending the first data packet through a network interface of a corresponding wireless communication link according to the link identifier of the first data packet, wherein the established state is used for indicating that a server has responded to the first data stream.

3. The method according to claim 1, wherein the data streams are data streams of at least one data transmission task of the electronic device, each data transmission task is associated with an application started by the electronic device, and each data transmission task comprises one or more data streams.

4. The method according to claim 3, wherein the preset correspondence relationship further comprises a correspondence relationship between the wireless communication links and preset parameters of the data streams, and
   selecting the first wireless communication link from the plurality of wireless communication links for the first data packet comprises: querying the preset correspondence relationship according to values of the preset parameters of the first data stream, and determining the first wireless communication link corresponding to the values of the preset parameters of the first data stream.

5. The method according to claim 1, further comprising:
   establishing the preset correspondence relationship according to a preset data stream splitting strategy.

6. The method according to claim 5, wherein establishing the preset correspondence relationship according to the preset data stream splitting strategy comprises:
   determining channel quality parameters of each wireless communication link in the plurality of wireless communication links, wherein the channel quality parameters comprise at least one of a transmission delay and a transmission rate; and
   establishing the preset correspondence relationship between the data streams and the wireless communication links according to the channel quality parameters of the wireless communication links and preset parameters of the data streams.

7. The method according to claim 6, wherein the preset parameters of the data streams comprise at least one of a data amount, a type, and a priority; and
   the priority comprises at least one of the following: an importance level, a task type level, and a security level.

8. The method according to claim 5, wherein establishing the preset correspondence relationship according to the preset data stream splitting strategy comprises:
   determining device capability information of a wireless communication module of the electronic device; and
   establishing the preset correspondence relationship between the data streams and the wireless communication links according to the device capability information of the wireless communication module and preset parameters of the data streams.

9. The method according to claim 1, wherein the first data packet is a data packet generated by the electronic device; or,
   the first data packet is a data packet received by the electronic device.

10. An electronic device, comprising a processor, a memory, a communication interface, and one or more programs stored in the memory and configured to be executed by the processor, and the one or more programs comprising instructions for performing the following operations:
   acquiring a first data packet to be sent;
   determining a first data stream to which the first data packet belongs;
   detecting a link state of the first data stream;

when the link state of the first data stream is an establishing state, and the first data packet is sent for a first time, selecting a first wireless communication link from a plurality of wireless communication links for the first data packet, and marking the first data packet according to a first link identifier of the first wireless communication link; and sending the first data packet through a network interface of the first wireless communication link according to the first link identifier;

wherein selecting the first wireless communication link from the plurality of wireless communication links for the first data packet comprises:

querying a preset correspondence relationship to determine the first wireless communication link corresponding to the first data stream, wherein the preset correspondence relationship comprises a correspondence relationship between data streams and the plurality of wireless communication links and a correspondence relationship previously configured by a user and a default correspondence relationship in the electronic device; and when there is no correspondence relationship previously configured by the user or there is no wireless communication link corresponding to the first data packet found according to the correspondence relationship previously configured by the user, determining the first wireless communication link corresponding to the first data packet according to the default correspondence relationship in the electronic device;

wherein the default correspondence relationship in the electronic device comprises an order of the plurality of wireless communication links; and wherein determining the first wireless communication link corresponding to the first data packet according to the default correspondence relationship in the electronic device comprises:

selecting a wireless communication link according to the order of the plurality of wireless communication links as the first wireless communication link.

11. The electronic device according to claim 10, wherein the one or more programs further comprise instructions for performing the following operations:

when the link state of the first data stream is an established state, marking the first data packet according to a link identifier of the first data stream, and sending the first data packet through a network interface of a corresponding wireless communication link according to the link identifier of the first data packet, wherein the established state is used for indicating that a server has responded to the first data stream.

12. The electronic device according to claim 10, wherein the one or more programs further comprise instructions for performing the following operations:

establishing a preset correspondence relationship according to a preset data stream splitting strategy.

13. The electronic device according to claim 12, wherein establishing the preset correspondence relationship according to the preset data stream splitting strategy comprises:

determining channel quality parameters of each wireless communication link in the plurality of wireless communication links, wherein the channel quality parameters comprise at least one of a transmission delay and a transmission rate; and establishing the preset correspondence relationship between data streams and the wireless communication links according to the channel quality parameters of the wireless communication links and preset parameters of the data streams.

14. A non-transitory computer readable storage medium, storing a computer program, wherein the computer program is executable by a computer to perform the following operations:

acquiring a first data packet to be sent;

determining a first data stream to which the first data packet belongs;

detecting a link state of the first data stream;

when the link state of the first data stream is an establishing state, and the first data packet is sent for a first time, selecting a first wireless communication link from a plurality of wireless communication links for the first data packet, and marking the first data packet according to a first link identifier of the first wireless communication link; and sending the first data packet through a network interface of the first wireless communication link according to the first link identifier;

wherein selecting the first wireless communication link from the plurality of wireless communication links for the first data packet comprises:

querying a preset correspondence relationship to determine the first wireless communication link corresponding to the first data stream, wherein the preset correspondence relationship comprises a correspondence relationship between data streams and the plurality of wireless communication links and a correspondence relationship previously configured by a user and a default correspondence relationship in the electronic device; and when there is no correspondence relationship previously configured by the user or there is no wireless communication link corresponding to the first data packet found according to the correspondence relationship previously configured by the user, determining the first wireless communication link corresponding to the first data packet according to the default correspondence relationship in the electronic device;

wherein the default correspondence relationship in the electronic device comprises an order of the plurality of wireless communication links; and determining the first wireless communication link corresponding to the first data packet according to the default correspondence relationship in the electronic device comprises:

selecting a wireless communication link according to the order of the plurality of wireless communication links as the first wireless communication link.

* * * * *